Aug. 8, 1972   E. J. HUNTER ET AL   3,682,752
APPARATUS FOR MAKING PLASTIC VENETIAN BLIND TAPE
Original Filed Dec. 2, 1964   2 Sheets-Sheet 1
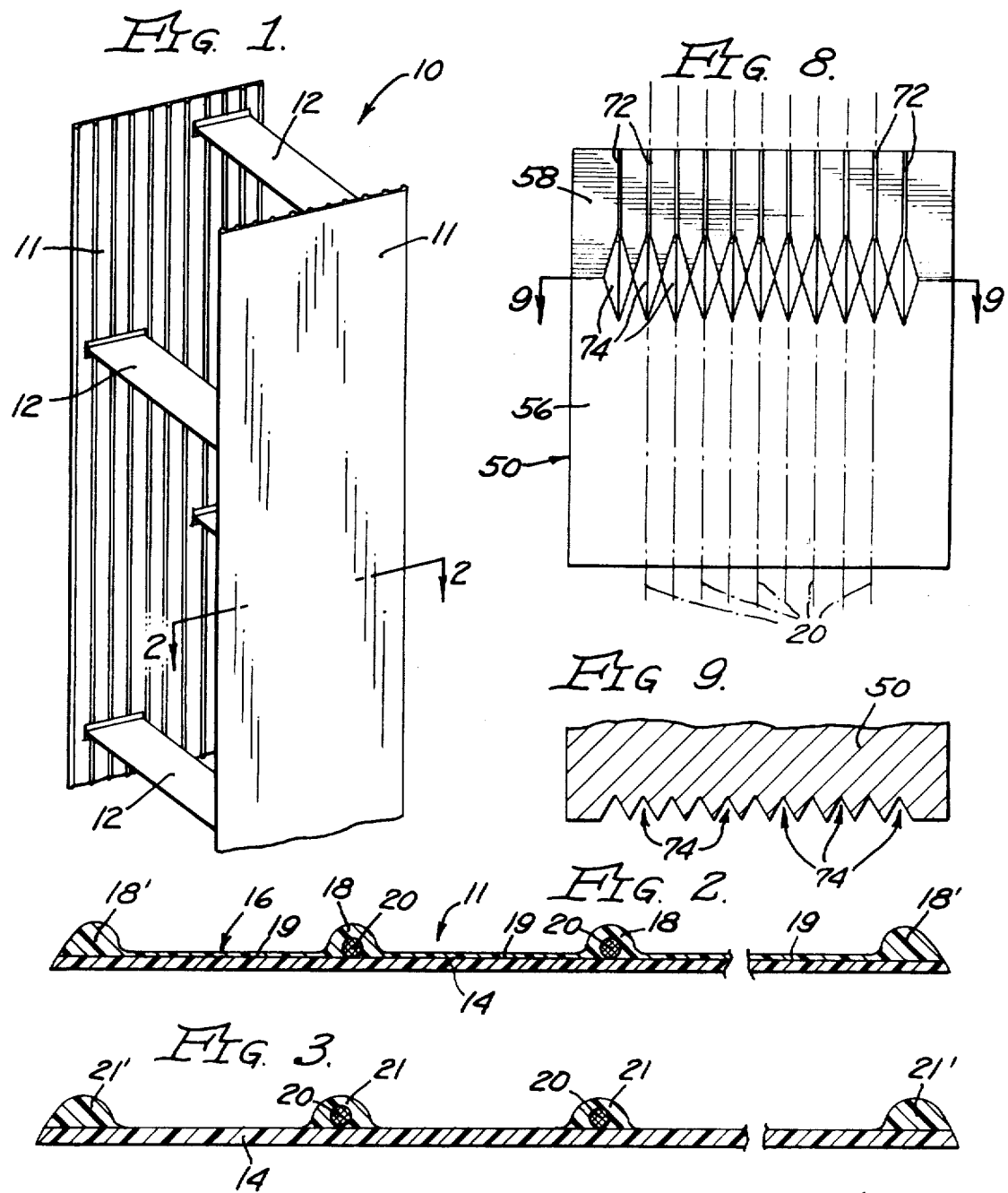
EDWIN J. HUNTER
GEORGE H. STARRETT
DAVISON B. SWING
INVENTORS.
BY Herbert E. Fidder
AGENT

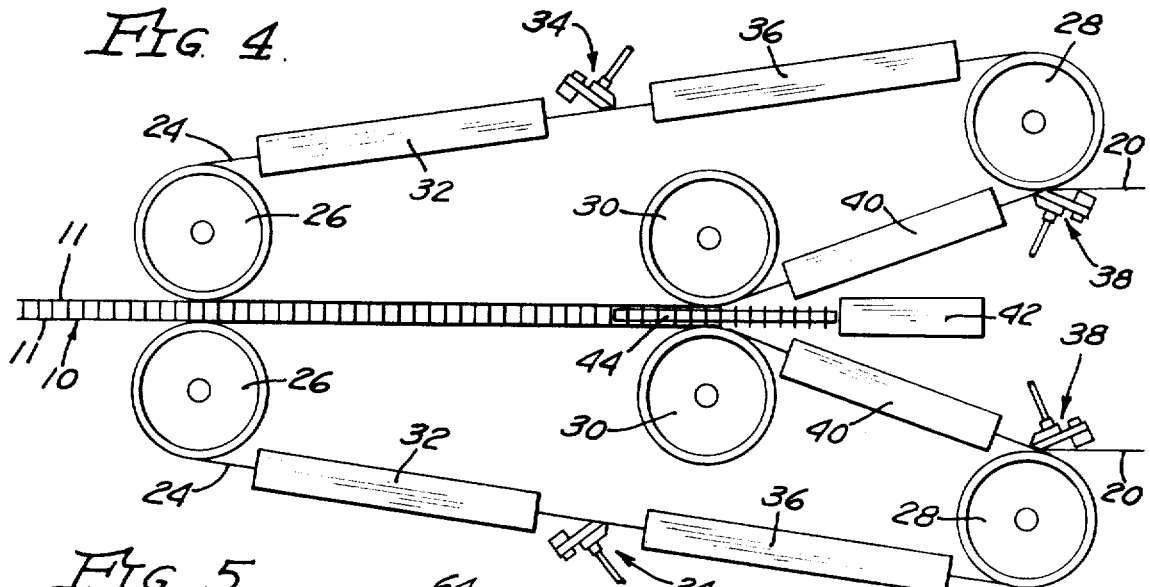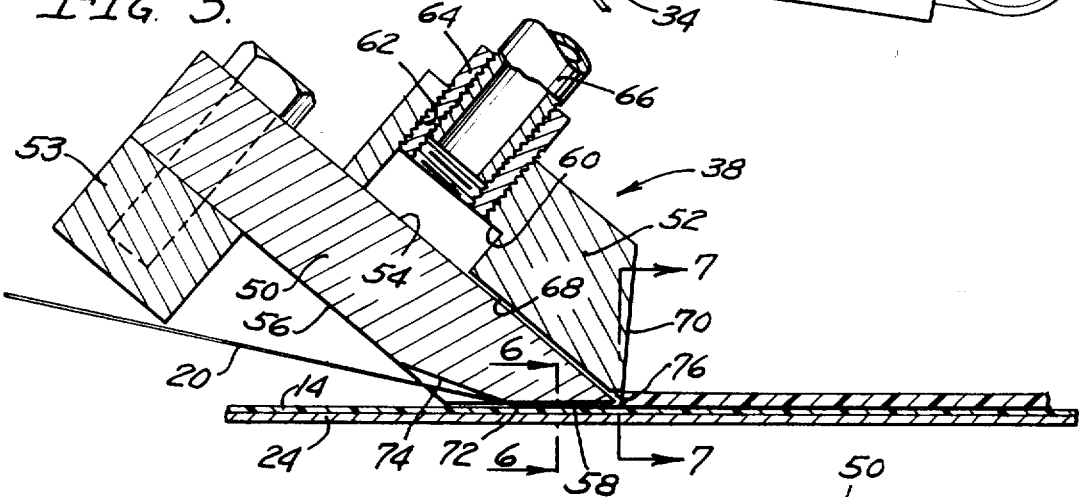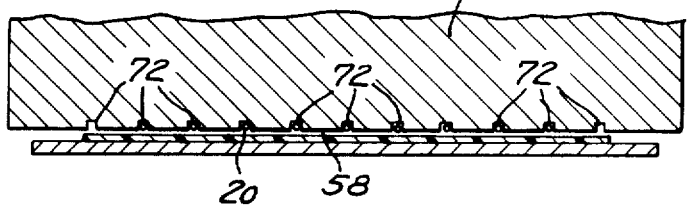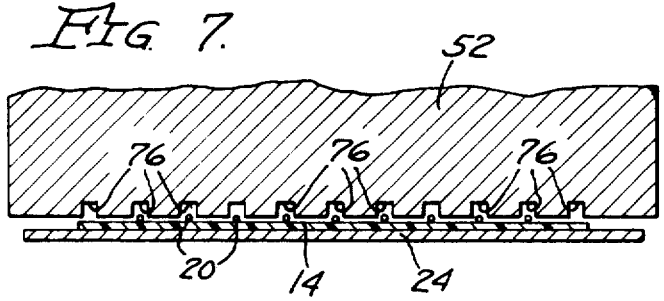

United States Patent Office 3,682,752
Patented Aug. 8, 1972

3,682,752
APPARATUS FOR MAKING PLASTIC VENETIAN BLIND TAPE
Edwin J. Hunter, 810 S. University Drive 92507; George H. Starrett, 3545 Spruce St. 92507; and Davison B. Swing, 5414 Provence Place 92506, all of Riverside, Calif.
Original application Dec. 2, 1964, Ser. No. 415,400. Divided and this application June 2, 1969, Ser. No. 870,088
Int. Cl. B32b 31/04
U.S. Cl. 156—552
8 Claims

ABSTRACT OF THE DISCLOSURE

A pair of movable carriers are each trained around three wheels, forming two similar obtuse-angled triangles arranged side-by-side. A first coating head spreads a thin layer of plastisol on each band between two of said wheels, and a first oven fuses the plastisol before it reaches one of said two wheels. A second coating head between said one wheel and the wheel situated at the obtuse angle lays a plurality of laterally spaced threads on the plastic strip and additionally covers the threads with a thin layer of plastisol. A second oven fuses the second coating before said obtuse angle wheel is reached. Ladder rungs are inserted between and fused to the strips in the stretch where the triangles are arranged side-by-side and the carriers run parallel.

---

The present invention relates to plastic tape for Venetian blind ladder tapes, and its primary object is to provide a method and apparatus for making a new and improved plastic tape that is lower in cost, and at the same time softer and more pliable, than tape made by present methods.

This application is a division of our pending application Ser. No. 415,400, filed Dec. 2, 1964, now abandoned.

Plastic ladder tapes for Venetian blinds have come into widespread use because they are decorative in appearance, easy to keep clean, long lasting, and relatively low in cost. The side tapes of these ladders are usually made of very soft, pliable polyvinyl chloride, with longitudinally extending threads of low stretch, high tensile-strength fibers embedded therein to prevent stretch.

One well-known method of making plastic side tape for Venetian blind ladders consists in spreading thin layers of polyvinyl chloride plastisol on each of two endless steel bands having patterned surfaces; passing the bands through ovens so as to fuse the plastisol into a homogeneous plastic film; laying a number of parallel threads of stretch-resisting fibers on the surface of each of the just-fused plastic films; spreading another layer of plastisol over the threads; passing the bands through another oven so as to fuse the outer layer of plastisol; bringing the two bands around so-called "hot wheels" which heat the plastic up to the temperature at which it becomes tacky, the said bands being parallel to one another and spaced apart substantially the same distance that the side tapes are spaced apart in the finished ladder tape; and inserting plastic cross straps, or "rungs" into the space between the tapes, with the ends of the cross straps touching the tacky plastic side tapes so that they weld thereto. After cooling, the finished ladder tape is stripped from the steel bands.

One of the fibers most commonly used in making plastic tapes is a modified rayon, manufactured and sold by Celanese Corp., under the trademark "Fortisan." Fortisan is an excellent fiber for this purpose, but its one disadvantage is that it is relatively expensive. Attempts have been made to use fiberglass, which has extremely high tensile strength combined with low elasticity, and which has extremely high tensile strength combined with low elasticity, and which is also quite inexpensive compared to Fortisan. However, these efforts have not been successful, owing to the fact that fiberglass threads tend to break when the tape is folded sharply on itself, as when the blind is drawn up into a tightly accumulated bundle.

Investigation into the cause of this breakage reveals that the threads embedded within the plastic material are sometimes only one or two thousandths of an inch in from the patterned side of the tape, that was adhered to the steel band. This patterned side of the tape is on the outside of the finished ladder tape, and when a Venetian blind is tightly accumulated, the side tapes are folded alternately inwardly and outwardly between succeeding pairs of slats; the inwardly folded portions being clamped tightly between two adjoining slats and being sharply creased thereby. With only a thousandth of an inch or so of plastic between the fiberglass threads and the surface of the tape, the threads may be bent around a radius of as little as one or two thousandths of an inch. Bending the fiberglass threads this sharply causes them to break, and as a result, fiberglass has been more or less abandoned in favor of Fortisan, which can withstand sharp bending without damage.

We have found that if fiberglass threads of the size used in Venetian blind tapes are bent to a radius of not less than about .004", the strands can be flexed many thousands of times without breaking. It is only when the radius is appreciably less than about .004" that the elastic limit of the fiberglass fibers is exceeded, and the fibers tend to fracture.

Another important object of the invention, therefore, is to provide a method and apparatus for making plastic tape of the class described, which is so constructed that it is virtually impossible for the embedded threads to be bent to a radius of less than .004" under normal usage, and which is therefore adapted to use fiberglass threads, with their advantageous high strength and low cost.

A further object of the invention is to provide a method and apparatus for making plastic tape of the class described having improved tear-resistance along the lengthwise direction, and at the same time, an average thickness considerably less than that of prior tape. Other things being equal, the thinner the tape, the softer and more pliable it is. However, tear-resistance is proportional to the thickness of the tape at its weakest point. Thus, the two desirable properties of good tear-resistance and soft pliability have heretofore been mutually incompatible, and prior plastic tape has been a compromise, wherein a certain degree of pliability has been sacrificed for tear-resistance. With the present invention, good tear-resistance is achieved in a relatively thin tape, and this is accomplished by virtue of a novel cross-sectional configuration, which is illustrated in the drawings.

In the manufacture of prior plastic tape, a relatively large number of closely spaced, stretch-resisting threads are embedded in the plastic, and as these threads travel around the "hot wheels" of the machine, they are pulled tight, owing to the fact that they are at a slightly greater distance from the center of the wheel than the radius of the plastic film at its inner surface. This tension causes the threads to sink down into the softened, underlying plastic film, and the viscous plastic directly over the thread is sucked down into a slight, V-shaped furrow. At the same time, the plastic that is displaced from under the thread is squeezed out toward either side and produces humps, or ridges, between the threads. These humps thicken the plastic tape without producing any useful strengthening effect, as the furrows directly over each of the threads reduce the thickness of the plastic at this particular point, and create lines of weakness. Prior tape invariably tears directly down the length of the thread, and the tear-resistance is sometimes quite weak.

In the present invention, a considerably lesser number of reinforcing threads is used, and these are spaced farther apart than in prior tape. Each thread is covered by a narrow ridge of plastic, which is of substantially the same thickness as the underlying film of plastic film, so that the thread is approximately centered within the plastic film. Between these longitudinally extending, parallel ridges covering the threads, the plastic tape is flat and of a uniform thickness somewhat greater than the minimum thickness of prior tape at the bottom of the furrows mentioned earlier, yet only about half the maximum thickness thereof, measured to the tops of the humps. There are no V-shaped furrows in the surface of the present tape to create lines of weakness, along which the tape will tear easily, nor is there any excessive thickness of the plastic film to reduce the pliability of the tape. Instead, the present invention provides a plastic tape that is thinner than prior tape, yet stronger in its tear resistance. The thinner tape of the present invention has the added advantage of using less plastic, which further reduces its cost beyond the savings effected by using Fiberglas threads instead of Fortisan.

Still a further object of the invention is to provide a method and apparatus for making plastic tape that remains flat, and has no tendency to curl inwardly on its patterned face. This curling tendency usually does not appear until some time after the tape has been stripped from the machine, and seems to be more pronounced in thinner tape than in thicker tape. This is one more reason why prior tape is made as thick as it is. We have found that the curling tendency can be eliminated by using a higher proportion of plasticizer in the plastisol of the second coat, than is used in the plastisol of the first coat. The difference in plasticizer proportion varies with different factors, but is typically on the order of 5%.

These and other objects and advantages of the present invention will become apparent to those skilled in the art upon consideration of the following detailed description of the preferred embodiment thereof, reference being had to the accompanying drawings, wherein:

FIG. 1 is a perspective view of a short length of plastic Venetian blind ladder tape, made with side tapes manufactured by the method and apparatus of the present invention;

FIG. 2 is a greatly enlarged sectional view through one of the side tapes, taken at 2—2 in FIG. 1;

FIG. 3 is a view similar to FIG. 2, showing another form of tape that can be made by the method and apparatus of the invention;

FIG. 4 is a schematic plan view of a machine for making the ladder tape shown in FIG. 1;

FIG. 5 is an enlarged, partially cut away view of one of the coating heads used in the machine of FIG. 4 showing the threads being laid on the first layer of plastic and being covered by the second layer of plastic;

FIG. 6 is an enlarged fragmentary sectional view taken at 6—6 in FIG. 5;

FIG. 7 is an enlarged fragmentary sectional view taken at 7—7 in FIG. 5;

FIG. 8 is a bottom view of the coating head shown in FIG. 5; and

FIG. 9 is an enlarged fragmentary sectional view taken at 9—9 in FIG. 8.

In FIG. 1, the Venetian blind ladder tape is designated in its entirety by the reference numeral 10, and comprises side tapes 11 which are connected by vertically spaced, laterally staggered cross straps, or "rungs" 12, the ends of which are welded to the side tapes.

The present invention is concerned primarily with the side tapes 11, one of which is shown in greatly enlarged detail in FIG. 2. It will be noted that each of the tapes 11 consists of two layers 14 and 16. The first layer 14 is relatively flat and comparatively uniform in thickness from one edge to the other. The second layer however, is formed with a plurality of laterally spaced, longitudinally extending ridges 18, which are connected together by thin webs 19. Each of the ridges 18 (with the exception of the extreme outermost ridges 18') encloses a longitudinally extending, stretch-resisting thread 20. The threads 20 are preferably two-ply fiberglass yarns of .006" nominal diameter, although other materials and/or other sizes could be used.

In a representative example of the present invention, having an over-all width of 1 7/16" there may typically be eleven ridges 18 which are spaced apart from one another about 5/32", measured from center to center. For a narrower tape, the ridges 18 could be spaced apart from one another as little as 1/16". Each ridge is about 1/32" wide, and the distance between ridges is about 1/8". The first layer of plastic 14 is about .004" thick. The webs 19 of second layer 16 are about .002" or .003" thick, and each ridge 18 covers its enclosed thread 20 with about .004" thickness of plastic. Assuming that the thread 20 is .006" in diameter, the maximum thickness of the tape, measured to the tops of the ridges 18, is about .014", whereas the minimum thickness of the tape, measured to the top surface of the narrow bands between the ridges, is only about .006" to .008". The beads 18' of plastic at the outer edges of the tape provide some stiffening reinforcement, to prevent the edges of the tape from curling.

The embodiment shown in FIG. 3 is very similar to the one shown in FIG. 2; and the only difference being that there is no complete second layer, such as the second layer 16 of FIG. 2, but instead, there are separate ridges of plastisol 21, 21', which are individually fused to the top surface of plastic strip 14. Each of the ridges 21 encloses a thread 20, and the latter is covered on all sides by a layer of plastic at least equal in thickness to the thickness of the strips 14.

The plastic tape is made on a machine similar to that shown schematically in FIG. 4. The machine comprises two movable carriers, preferably in the form of endless steel bands 24 having patterned surfaces, each of which passes around three wheels 26, 28 and 30. The two bands 24 and their respective sets of wheels 26, 28 and 30, form two similar, obtuse-angled triangles arranged side-by-side, and that portion of the bands extending from wheels 30 to wheels 26 is parallel and spaced apart from one another a distance approximately equal to the space between the tapes 11 on the ladder tape 10. After leaving the wheel 26, each of the bands 24 passes through a pre-heat oven 32, and a thin coating of polyvinyl chloride plastisol is spread on the band by a first coating head 34. The metal band, with its adhered layer of plastisol, then travels through a second oven 36, in which the plastisol is fused to a homogeneous plastic film. Upon emerging from the oven 36, the band 24 passes around wheel 28, where a second coating head 38 lays the longitudinally extending threads 20 on the first layer of plastic, and simultaneously spreads a second layer of plastisol over the first film of plastic, thereby covering the threads. The band 24 then enters a third oven 40, where the second layer of plastisol is fused. It will be noted in FIG. 3 that from wheel 28 to wheel 30, the bands 24 converge toward the longitudinal centerline of the machine at an angle of about 20 degrees, the total included angle between the two bands being about 40 degrees.

From the oven 40, the steel band 24 passes around a third wheel 30 located at the obtuse angle of the triangle. Wheel 30 is preferably heated by gas or electricity, to melt the plastic on the steel band to the "tacky" condition and is therefore called the "hot wheel." At this point, strips of plastic are cut to length by a chopper 42 and are dropped into a conveyor 44, which carries them into the space between the two bands 24, traveling in the same direction and at the same speed as the latter. The cross straps 12 are held in proper spaced relationship with their ends touching the plastic strips on both of the bands 24, and as the plastic cools, the cross straps are firmly welded to the side tapes. After cooling, the ladder tape is stripped from the steel bands at the point where the latter pass around the wheels 26.

There is one important difference between the present machine, shown in FIG. 4, and the prior machine described earlier, and that is the fact that the bands have passed around the end wheels 28 and are headed back in the general direction toward the other end of the machine at the time the stretch-resistant threads and second layer of plastisol are placed on top of the first layer of plastic. As a consequence of this arrangement, the bands 24 wrap around the "hot wheels" 30 for only a short angular distance, of the order of 20 degrees. Other things being equal, the amount of tension in the threads is a function of the total angular distance that the plastic tape is wrapped around the "hot wheels," and the 20-degree turn made by the tape on the prior machine. The tension of the threads 20 is therefore only about one-ninth the tension of the threads in tape made by the prior machine as the tape travels around the "hot wheel," and the threads are not caused to sink down into the underlying first layer 14. The threads 20 thus remain centered within the plastic, and the .004" distance from the threads to the patterned surface of the tape is not appreciably altered.

One other part of the present machine that is distinctively different from its counterpart on the prior machine, is the second coating head 38, shown in FIGS. 4-8, which will now be described. Head 38 is essentially a two-piece unit, consisting of a low member 50 and an upper member 52, which are joined together by screws (not shown) and supported on a mounting member 53. Lower member 50 has parallel, flat, top and bottom surfaces 54 and 56 and an inclined end surface 58, which is disposed at an angle of about 40 degrees to the bottom surface 56. The top member 52 has a cavity 60 formed in its bottom surface, and an internally threaded hole 62 extending from the cavity 60 to the top surface of the member. The tubular fitting 64 is screwed into the hole 62, and is also threaded internally to receive the end of a plastisol-supply pipe 66.

The upper member 52 has a very shallow, slot-like orifice 68, about .017" in depth, extending from the cavity 60 to the end of the unit 38 formed by the junction of the end surface 58 with the corresponding end surface 70 on the upper member. The included angle between end surfaces 58 and 70 is about 95 degrees in the coating head shown in FIG. 4, although this is not critical. The transverse width of the orifice 68 is the same as that of the tape 11.

Formed in the end surface 58 of the lower member 50 are a plurality of laterally spaced grooves 72, which are spaced apart from one another the same distance as the threads 20 in the tape 11. The grooves 72 serve as guides for the threads 20, and each groove is preferably about .010" wide and .010" deep. At the junction of end surface 58 with bottom surface 56, the grooves are widened and deepened, and take the form of V-shaped notches 74, as shown in FIGS. 7 and 8.

The end wall 70 of the upper member 52 is likewise cut out to form notches 76, which register with the grooves 72. The notches 76 are preferably about twice as wide and twice as deep as the grooves 72, (i.e., about .020" wide and .020" deep).

The coating head 38 is mounted on the machine so that the end surface 58 is substantially in contact with the plastic film on the band 24. The threads 20 are led into the grooves 72 through the V-shaped notches 74, as shown in FIG. 5, and the threads are laid flat on the surface the first layer of plastic, which is already adhered to the band 24. Plastisol is pumped into the coating head through the supply pipe 66, and is extruded through the orifice 68 and onto the first layer of plastic 14, through the notches 76. A very thin film of plastic is also extruded onto the first layer of plastic between the notches 76, and this forms the thin webs 19 between ridges 18, as shown in FIG. 2. As the plastic strip is carried away from the coating head 38, the ridges of plastisol tend to assume the generally semi-circular cross-sectional configuration shown in FIG. 2.

In the case of the plastic tape shown in FIG. 3, the end surface 58 of the coating head 38 bears directly against the film 14 of plastic, and no plastisol is extruded onto the film 14 between the ridges 21, 21'. Instead, the ridges 21, 21' are extruded as separate ribbons of plastisol, each of which (with the exception of the outermost ridge 21") covers a thread 20 with a generally semi-cylindrical layer of plastisol about .004" thick.

The two metal bands 24 with the plastic side tapes 11 adhered thereto, come together in spaced parallel relationship after passing around the opposite "hot wheels" 30, and at the same time, cross straps 12 are inserted between the side tapes and are welded thereto.

We have found that a flat tape, having no tendency to curl, can be produced by making the two layers 14 and 16 with different ratios of plasticizer. It is necessary that the bottom layer 14 have a slightly smaller proportion of plasticizer than the top layer 16; the amount of difference being typically of the order of 5 percent. This may be obtained by adding approximately 5 percent additional plasticizer to the formulae used in making film 14, for the second layer 16. The plasticizer may be of any of the well-known and commonly used liquid plasticizers, such as dioctyl/phthalate, dicapryl/phthalate, or the like. Alternatively, the plastisol used for the first layer 14 and second layer 16 may be two separate formulations, the first being made with a smaller quantity of plasticizer than the second.

To the best of applicants' knowledge, there has never been a published explanation as to why plastic tape should develop this peculiar curling tendency, and it is believed that the reason has heretofore not been known. By a process of deductive reasoning (supported by subsequent experimentation) we have discovered evidence that the curling tendency is due to migration of plasticizer in the finished tape, and that this migration is caused by a condition resulting from a differential loss of plasticizer from the two layers 14, 16 during the manufacturing process. In the case of the first layer 14, plasticizer is lost by evaporation (or volatilization) from the exposed top surface when the band passes through oven 36. There is no loss of plasticizer from the bottom surface of layer 14, since the bottom surface is adhered to the steel band 24 and is not exposed.

When the second layer 16 of plastisol is spread on top of the just-fused first layer 14, and the band then passes through oven 40, a certain amount ef the plasticizer in the top layer is absorbed into the underlying layer 14, while some of the plasticizer is evaporated from the exposed top surface of layer 16, and is lost to the atmosphere. The top layer 16 thus loses plasticizer from both its top and bottom surfaces, whereas the bottom layer 14, which lost plasticizer from its top surface only, regains a certain amount of the lost plasticizer by absorption from the top layer. As the plastic tape leaves the machine, therefore, there is a differential in plasticizer content between the top and bottom layers.

In time, the excess of plasticizer in the bottom layer 14 migrates into the top layer 16, which had a deficiency in plasticizer at the time the tape was removed from the band 24, and the plasticizer eventually becomes uniformly dispersed throughout the plastic tape. During the process of equalization, the top layer 16 gains plasticizer and expands slightly in volume, while the bottom layer 14 loses plasticizer and shrinks slightly in volume. This shrinking of one side and expanding of the other causes the tape to curl.

By making the top layer 16 with a plastisol having a higher plasticizer content than the plastisol used in the bottom layer 14, the proportionately greater loss of plasticizer from the top layer results in equalization of the plasticizer content of the two layers 14 and 16 at the time the tape comes off the machine. With no appreciable variation in plasticizer content between the two layers, there is no appreciable migration of plasticizer in the finished tape. Consequently, there is no subsequent swelling of the plastic on one side of the tape and shrinking on the other side, and the tape therefore remains flat. The 5 percent differential in plasticizer content is not a hard and fast figure, as the exact amount of plasticizer depends upon a number of variables; however, 5 percent is probably a good average figure that will give good results in most cases.

While we have shown and described in considerable detail what we believe to be the preferred form of our invention, it will be understood by those skilled in the art that various changes may be made without departing from the broad scope of the invention as defined in the following claims.

We claim:

1. An apparatus for the manufacture of ladder tape for Venetian blinds, comprising two movable carriers and two groups of three guiding means, each of said carriers passing around one of said two groups of three guiding means, at least one of said guiding means being power driven, the three guiding means in each group constituting the angle points of a triangle, said two groups of guiding means being arranged in such a way that the triangles formed thereby have their bases extending parallel to each other and spaced apart a distance substantially equal to the width of the ladder tape to be manufactured, one of the base angles of each triangle being obtuse, said triangles constituting the reflected image of each other, said apparatus further comprising, at the side of the triangle opposite to the obtuse angle for each carrier a first coating head for spreading a thin layer of plastic on the outer surface of the carrier between the two guiding means situated at the ends of the triangle side, a first heating device between said first coating head and the next guiding means situated in the direction of movement, there being provided between this last-mentioned guiding means and the guiding means situated in the obtuse angle point subsequently in the direction of movement means for placing a plurality of reinforcing strands against the outer surface of said layer of plastic, a second coating head for applying a second layer of plastic, and a second heating device, there being provided furthermore, between the guiding means in the obtuse angle point and the next guiding means along the line of travel, means for arranging cross straps between the plastic strips adhering to said carriers, and means positioning the cross straps with their ends in contact with the plastic strips until the cross straps have been welded to the plastic strips, the finished ladder tape being removed from the carriers when the latter have arrived at the location of the next guiding means along the line of travel from the guiding means in the obtuse angle point.

2. An apparatus as claimed in claim 1, wherein each of said movable carriers comprises an endless conveyor band.

3. An apparatus according to claim 1, characterized in that at least one of the guiding means in each of said groups is heated to a temperature above the fusion temperature of the plastic.

4. An apparatus according to claim 1, characterized in that the second coating head for applying the second plastic layer and the means for providing reinforcing strands are combined in one device.

5. An apparatus according to claim 4, characterized in that said second coating head for applying the second plastic layer has an end surface which is parallel to the carrier at that location, there being provided in said end surface a plurality of transversely spaced, longitudinal grooves with parallel centerlines for guiding said reinforcing strands, said second coating head being provided with an internal supply pipe and at least one extrusion orifice for plastic, terminating at the farthest end of said end surface, viewed in the direction of movement of the carrier, said extrusion orifice being located beyond said grooves with respect to the direction of travel of said carrier, whereby said strands are laid onto said first layer of plastic and are covered by plastic issuing from said extrusion orifice.

6. An apparatus according to claim 5, characterized in that, viewed in the direction of movement of the carrier the longitudinal grooves in the coating head start ahead of the end surface and convergingly extend toward the carrier along a first portion and subsequently change into parallel grooves of constant width.

7. An apparatus for the manufacture of ladder tape according to claim 5, in which the reinforcing strands of the tape consist of interspaced bundles of threads and/or fibers, characterized in that more extrusion orifices are provided of which the center lines intersect the center lines of the parallel grooves, said extrusion orifices being dimensioned such that only at the location of the respective bundles a layer of plastic is provided for coating the bundles.

8. An apparatus according to claim 5, characterized in that, viewed in cross-section, the coating head comprises in addition to the extrusion orifices situated over the two outermost longitudinal strand-guiding grooves on each side an extrusion orifice for the manufacture of thickened tape edges.

References Cited

UNITED STATES PATENTS

| | | | |
|---|---|---|---|
| 2,714,413 | 8/1955 | Hunter et al. | 156—65 |
| 2,767,113 | 10/1956 | Bower | 161—143 X |

BENJAMIN A. BORCHELT, Primary Examiner

H. J. TUDOR, Assistant Examiner

U.S. Cl. X.R.

156—65, 500